UNITED STATES PATENT OFFICE.

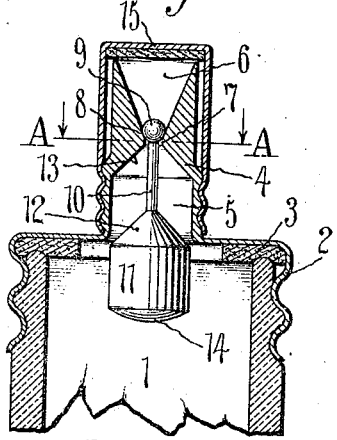
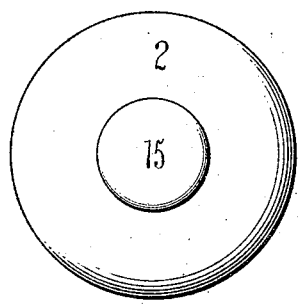
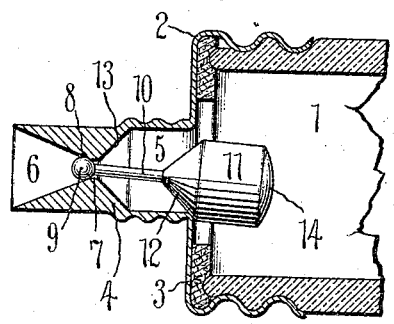
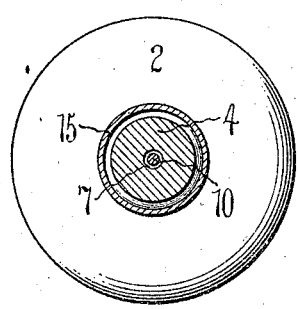
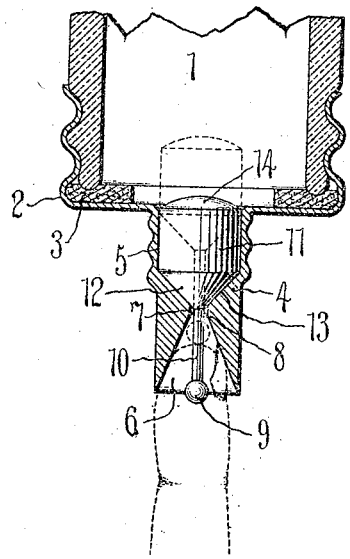

LEWIS G. LANGSTAFF, OF TORONTO, ONTARIO, CANADA.

LIQUID-DISPENSING VESSEL.

1,250,598. Specification of Letters Patent. Patented Dec. 18, 1917.

Application filed April 21, 1915. Serial No. 22,860.

*To all whom it may concern:*

Be it known that I, LEWIS G. LANGSTAFF, a citizen of the United States, and resident of Toronto, in the county of York, Province of Ontario, Dominion of Canada, have invented a new and useful Improvement in Liquid-Dispensing Vessels, of which the following is a specification.

The object of this invention is to provide certain improvements in liquid dispensing vessels with the particular object in view of providing a means for preventing the manual operation of the valve mechanism when the device is in an inverted position.

It has been found, in devices of this character, that a great waste of liquid has resulted from the fact that when the vessel was inverted the operator could drain it of its contents by merely pressing upward with his hand or finger on the valve. In my improved device, such a manipulation of the valve is prevented and the liquid can only be obtained in predetermined amounts.

A further object is to keep the parts of the device free from an accumulation of dried soap, or other liquid matter being used, by so arranging the various parts that when the vessel is in an upright position the liquid remaining on the walls of the outer chamber, in the valve port and on the plunger, will be drained back into the vessel.

A still further object is to provide certain improvements in the construction, form and arrangement of the various parts, whereby the above named objects may be effectively carried out.

A practical embodiment of my invention is represented in the accompanying drawings, in which—

Figure 1 represents the vessel in top plan view,

Fig. 2 represents a partial vertical central section, the parts being shown in the position which they assume when the vessel is in an upright position, Fig. 3 represents a similar section with the nozzle cap removed and the parts in the position occupied when the vessel is in a horizontal position, Fig. 4 represents a view similar to Fig. 3, with the parts in the position which they assume when the vessel is completely inverted, and showing, in dotted lines, the limit to which the valve may be raised by the finger of an operator, and Fig. 5 is a transverse section taken in the plane of the line A—A of Fig. 2, looking in the direction of the arrows.

The liquid dispensing vessel 1 may be made of any shape or size and of any desired material. This vessel is provided with a removable top 2 which is shown in the present instance as having a screw threaded engagement with the vessel. A suitable washer 3 may be interposed between the mouth of the vessel 1 and the top 2 to prevent leaking of the liquid at this point. The top 2 has a nozzle 4 which is provided with an interior dispensing chamber 5 and an exterior countersunk chamber 6 and these chambers are connected by the port 7 having a spherical valve seat 8.

The valve 9 for opening and closing the port 7 is spherical in shape and adapted to loosely fit on the seat 8.

A valve stem 10 extends through the port 7 into the chamber 5 where it is secured to the weighted plunger 11 which conforms in shape to the chamber 5 and is arranged to slide freely therein. This plunger has a tapered portion 12 arranged to engage the tapered walls 13 of the chamber 5 when the vessel is held in inverted position, as shown in Fig. 4.

The stem 10 of the valve is made considerably smaller in cross section than the cross sectional area of the port 7 so as to permit a free movement of the liquid through the port 7 when the valve is open as well as to allow a swinging movement of the plunger so that its tapered portion 12 may bear against the mouth of the vessel when the vessel is in any intermediate position between the upright and the inverted positions to hold the valve onto its seat.

The valve 9 is spherical in shape and is slightly larger than its seat so that when the vessel is in upright position any liquid remaining on the walls of the countersunk chamber 6 will drain through the port 7, along the sides of the plunger 11 and finally drop back into the vessel from the rounded inner end 14 of the plunger. This will prevent the liquid from drying in the port 7 and on the plunger 11 where it would tend to clog the action of the operating parts.

If it is desired, the nozzle 4 may be provided with a retaining cap 15 adapted for screw threaded engagement with the said nozzle.

When the vessel is inverted into the desired position for discharging the liquid, the weight of the plunger will cause it to drop by gravity into the dispensing chamber 5 and positively eject the liquid therein out through the port 7 and, at the same time, prevent the escape of any more liquid until the weighted plunger has been removed from the dispensing chamber. It will be readily seen that by providing my nozzle 4 with a countersunk chamber 6 whose bore is such that the finger of the operator cannot go far enough therein to raise the plunger out of the dispensing chamber, as shown in Fig. 4, I have effectually prevented the manual manipulation of the various parts of my device and have made it necessary for the operator desiring more liquid, to return the vessel to a position above the horizontal before it can be obtained.

Since my device is designed to eject, at one operation, a sufficient amount of the liquid to accomplish the purpose for which it is to be used, it will be readily seen that this improvement will prevent the unnecessary waste which an easy manipulation of any device of this character always invites.

It is evident that slight changes might be resorted to in the form, construction and arrangement of the several parts without departing from the spirit and scope of my invention; hence I do not wish to limit myself strictly to the structure herein set forth, but

What I claim is:—

A liquid dispensing vessel comprising a nozzle having an exterior outwardly flaring chamber, an interior dispensing chamber and a port connecting the two chambers, a valve for said port located in said exterior outwardly flaring chamber and spaced a considerable distance inwardly from the outer end of the nozzle when closing said port, and a weighted plunger connected to said valve and snugly fitting said dispensing chamber for positively ejecting liquid from the dispensing chamber when the vessel is inverted to a predetermined extent.

In testimony, that I claim the foregoing as my invention, I have signed my name in presence of two witnesses, this 19th day of March 1915.

LEWIS G. LANGSTAFF.

Witnesses:
H. M. CHRISTMAN,
D. S. TOVELL.

Copies of this patent may be obtained for five cents each, by addressing the "Commissioner of Patents, Washington, D. C."